May 26, 1936.  O. W. PARTAIN  2,041,948
CLUTCH
Filed Sept. 12, 1932
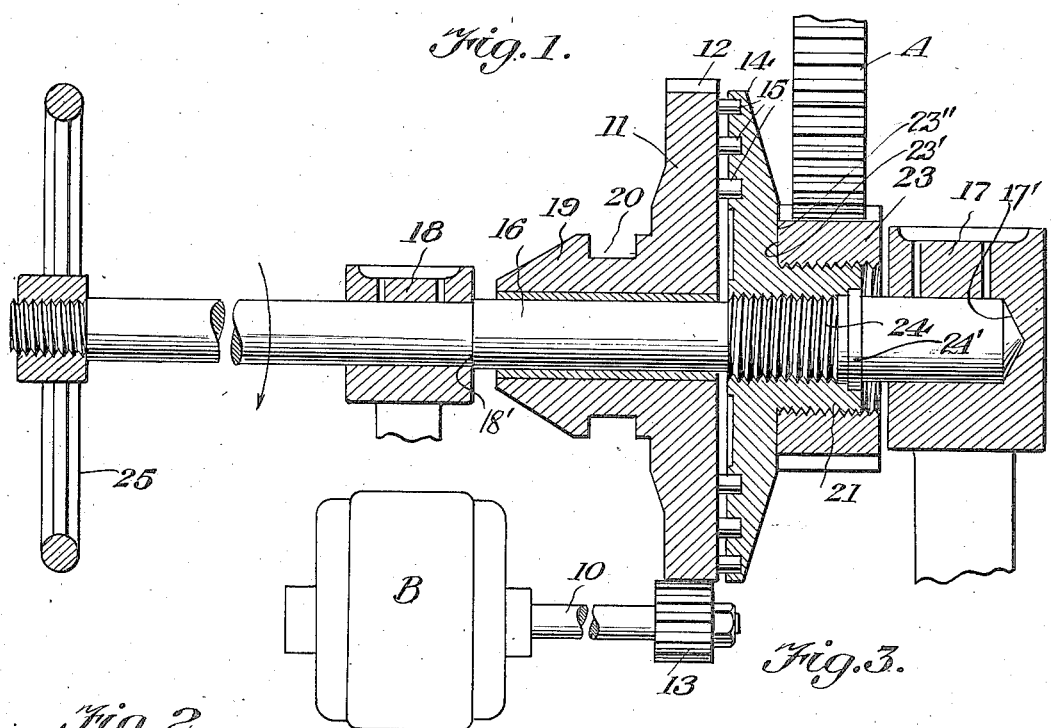
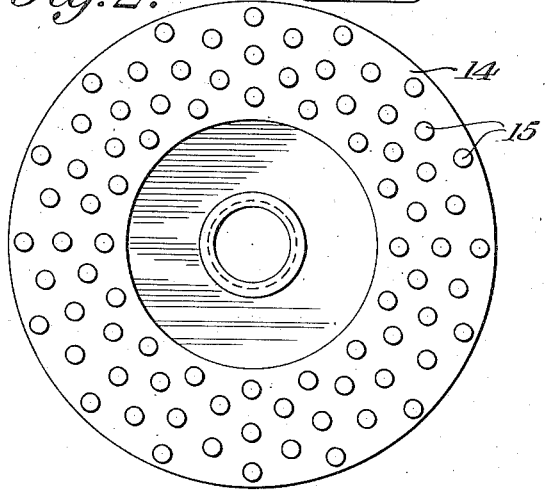
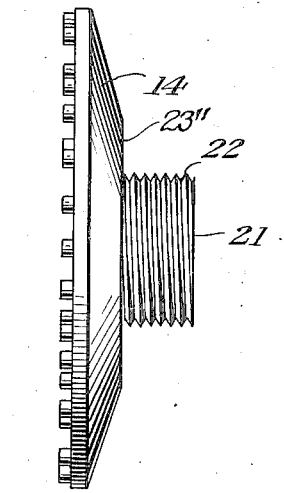
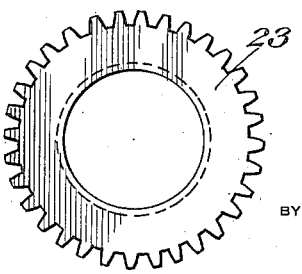
Oliver Wendol Partain
INVENTOR
BY Victor J. Evans & Co.
ATTORNEYS Patented May 26, 1936

2,041,948

UNITED STATES PATENT OFFICE 2,041,948

CLUTCH

Oliver Wendol Partain, Tulsa, Okla.

Application September 12, 1932, Serial No. 632,809

7 Claims. (Cl. 192—66)

The invention relates to a clutch and more especially to a textile loom clutch.

The primary object of the invention is the provision of a clutch of this character, wherein the driving half thereof is held against a frictionally faced companion driven half, the latter being held secure and will be prevented from loose play, particularly when the loom with which the clutch is associated comes to a sudden stop, and the mounting for the driven part will be prevented from working loose, thus assuring the assembly of the clutch intact.

Another object of the invention is the provision of a clutch of this character, wherein the clutch members are mounted in a novel manner and the assembly of said clutch assures tightness during the working thereof with a loom and especially when the latter comes to a sudden stop.

A further object of the invention is the provision of a clutch of this character, wherein the clutch members thereof are assured of close frictional contact and in this fashion the slipping of one member relative to the other is avoided and also will enable the driving half of the clutch to be geared directly to or connected by a belt to a power source.

A still further object of the invention is the provision of a clutch of this character, wherein the mounting thereof and the mode of operation are novel, the driven half of the clutch being assured of tightness so as to avoid any possible disassembling during the operation of the clutch in the working thereof with a loom.

A still further object of the invention is the provision of a clutch of this character, which is simple in construction, thoroughly reliable and efficient in its operation, readily and easily operated, requiring but few parts yet strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a fragmentary vertical longitudinal sectional view showing the clutch constructed in accordance with the invention with the driving member thereof engaged with the complementary driven member.

Figure 2 is a face view of the driven half of the clutch.

Figure 3 is an edge elevation thereof.

Figure 4 is a side elevation of the pinion associated with the driven half of the clutch.

Similar reference characters indicate corresponding parts throughout the several views in the drawing.

Referring to the drawing in detail, A designates a portion of a loom gear which I will term a secondary driven member, and B designates a power unit for the loom, the same in this instance being in the form of an electric motor having the drive shaft 10. Arranged between the gear A and the motor B is a driving unit constituting the present invention and which includes a clutch hereinafter fully described.

The clutch comprises a driving member 11 which is of disk form and carries peripheral gear teeth 12, these meshing with a pinion 13, the latter made secure upon the driven shaft 10 of the motor B. It is of course to be understood that in lieu of the gear teeth 12 the driving member 11 may be so constructed for operation by a belt operated from a source of power. Confronting the driving member 11 is the complementary driven clutch member 14 which I will term the primary driven member for driving the secondary driven member through a coupling member 23. The member 14 is of disk formation and has mounted in its working face corks 15, these preferably studded and are spaced apart in rows concentrically of the axis of rotation of the member 14 for frictional engagement with the working face of the driving member 11 of the clutch. It is to be understood of course that in lieu of the corks 15 the member 14 may be frictionally faced for frictional engagement with the working face of the driving member 11 of the clutch as should be apparent.

The members 11 and 14 of the clutch are fitted upon a clutch shaft 16 rotatably journaled in suitable bearings 17 and 18 respectively for rotation but held against longitudinal displacement by reason of a shouldered portion 18' on the shaft engaging against the bearing 18 and end engagement of the shaft against a stop 17' in the bearing 17. The shaft 16 constitutes the axis of rotation for the members 11 and 14. The member 11 is formed with a hub 19 having an annular groove 20 externally therein for accommodating a suitable presser ring (not shown) that is automatically operated upon stopping of the loom to disengage the member 11 from the member 14 as is the case in any conventional loom design and which forms no part of the present invention.

The member 14 of the clutch is formed with a hub 21 having external right hand screw threads 22 for corresponding threaded engagement in the coupling member which is in the form of a pinion 23 meshing with the loom gear A. The pinion 23 has a face portion 23' which normally has driven contact with the corresponding face portion 23" on the member 14. It is of course to be understood that the clutch assembly may be of the right or left hand type and in the left hand type the hub 21 will be provided with an external left hand screw thread for corresponding threaded engagement in the pinion 23.

The shaft 16 is formed with a left hand thread 24 in engagement internally of the hub 21 of the primary member 14. With the clutch assembly of the left hand type, the shaft 16 would be formed with a right hand thread engaged interiorly of the hub 21 of member 14. The outer free end of the shaft 16 carries a hand wheel 25 which serves to enable the manual turning of the loom to starting point and also serves as means for retaining the primary member 14 in tightened relation against a stop collar 24' on the shaft 16. When the parts are first assembled and the loom is turned by the hand wheel 25 in the direction of the arrow, this results in rotation of the shaft 16, the primary member 14 and the pinion 23. However, since the shaft is held against longitudinal movement and since rotation of the primary member 14 is resisted by its connection with the loom, its initial movement will be upon threads 24 until it is blocked by the stop collar 24', whereupon the shaft 16 and the primary member 14 will move as a fixed unit and since rotation of the pinion gear is likewise resisted the initial movement of the primary member 14 will cause the threads 22 to tighten in the internal threads of the coupling member 23. This effects movement of the coupling member 23 so that the face 23' thereof is moved into driven contact with the face 23" of the primary member 14. These movements of the threaded members relatively to each other occur substantially at the same instant and effect locking engagement of the shaft, the primary member 14 and the coupling or pinion member 23. When the power comes on under the motor drive, this locking relation is not affected because the frictional contact of the member 14 with the collar and the engagement of the contact faces 23' and 23" is sufficient under normal operation of the loom to keep the parts acting as a rigid unit.

Should the loom now become stalled it comes to a sudden stop and the driving member 11 will be automatically disengaged, as is conventional in loom design, from the primary member 14 by means of the presser ring above referred to and the tendency is for the member 14 to continue to rotate in the same direction to enhance the driven contact between the face 23" and the face 23' of the coupling due to their threaded connection. Likewise, the hand wheel 25, having momentum, has a tendency to continue rotation to cause the shaft to rotate and enhance stop engagement of the collar 24' with the primary member 14, which also enhances the gripping effect of the driven contact between the members 14 and 23 for the reason that the pinion 23 is in engagement with the stopped secondary driven member A and, therefore, cannot in itself change its position relatively to the hub of the member 14. However, due to the stopped engagement of the hub of the member 14 with the stop collar, these parts are in fact a rigid unit and the momentum of the hand wheel will effect and enhance the driven contact between the face 23" and 23'.

It is thus apparent that the parts 16, 14 and 23 become a rigid unit and the rigidity of their connections is enhanced with use due to the double arrangement of the threads tending to retain the parts in driving contact with each other upon each stopping of the loom.

What is claimed is:

1. A clutch of the character described comprising driving and driven friction-engageable clutch members, a power unit geared directly to the driving member, means for gearing the driven member with the machine, means manually operable for setting the machine at starting position through the driven member, the said second-named means constituting the axle for the driving and driven members of the clutch, and means automatically tightening the driven member on said axle when the machine suddenly stalls.

2. A clutch of the character described comprising driving and driven friction-engageable clutch members, a power unit geared directly to the driving member, means for gearing the driven member with the machine, means manually operable for setting the machine at starting position through the driven member, the said second-named means constituting the axle for the driving and driven members of the clutch, means automatically tightening the driven member on said axle when the machine suddenly stalls, and a hub on the driving member of the clutch and adapted for engagement with an adjustable presser lever.

3. A clutch of the character described comprising driving and driven friction-engageable clutch members, a power unit geared directly to the driving member, means for gearing the driven member with the machine, means manually operable for setting the machine at starting position through the driven member, the said second-named means constituting the axle for the driving and driven members of the clutch, means automatically tightening the driven member on said axle when the machine suddenly stalls, a hub on the driving member of the clutch and adapted for engagement with an adjustable presser lever, and a hub on the driven member of the clutch for the mounting of the gearing means with the machine.

4. A clutch of the character described comprising driving and driven friction-engageable clutch members, a power unit geared directly to the driving member, means for gearing the driven member with the machine, means manually operable for setting the machine at starting position through the driven member, the said second-named means constituting the axle for the driving and driven members of the clutch, means automatically tightening the driven member on said axle when the machine suddenly stalls, a hub on the driving member of the clutch and adapted for engagement with an adjustable presser lever, a hub on the driven member of the clutch for the mounting of the gearing means with the machine, and mountings for the manually operable means.

5. In a device of the character described, primary and secondary driven members, a coupling member having driven contact with the primary member and driving connection with the secondary member, means positively interconnecting said primary and coupling members to maintain said driven contact, and means interconnected with the primary member for cooperating with said interconnecting means to enhance said driven contact and to maintain said contact upon sudden stoppage of the secondary driven member.

6. In a device of the character described, a primary driven member having a threaded portion, a secondary driven member, a coupling member having driven contact with said primary member and threaded engagement with said threaded portion of the primary member to retain said driven contact, a driving connection between the coupling member and the secondary member, and means including a shaft having threaded engagement with the primary member for cooperating with said threaded connection of the coupling and primary members to enhance said driven contact and to maintain said contact upon sudden stoppage of the secondary driven member.

7. In a device of the character described, a primary driven member having a threaded portion, a secondary driven member, a coupling member having driven contact with said primary member and threaded engagement with the threaded portion of the primary member to retain said driven contact, a driving connection between the coupling member and the secondary driven member, a shaft having threaded engagement with the primary member for cooperating with said threaded connection of the coupling and primary members to enhance said driven contact, and a wheel member on the shaft to maintain said contact upon sudden stoppage of the secondary driven member.

OLIVER WENDOL PARTAIN.